United States Patent

[11] 3,580,359

| [72] | Inventor | Andreys O. Akermanis<br>3401 N. Westmoreland Drive, Orlando, Fla. 32804 |
|---|---|---|
| [21] | Appl. No. | 875,296 |
| [22] | Filed | Nov. 10, 1969 |
| [45] | Patented | May 25, 1971 |

[54] LADDER FOR FRUIT PICKER
6 Claims, 16 Drawing Figs.

| [52] | U.S. Cl. | 182/49 |
|---|---|---|
| [51] | Int. Cl. | E06c 7/08 |
| [50] | Field of Search | 182/49; 193/7 |

[56] References Cited
UNITED STATES PATENTS

| 588,130 | 8/1897 | Cole | 182/49 |
|---|---|---|---|
| 967,365 | 8/1910 | Gordon | 182/49 |
| 1,011,261 | 12/1911 | Helens | 182/49 |
| 1,774,223 | 8/1930 | Beucler | 182/49 |
| 2,348,504 | 5/1944 | Thomas | 182/49 |
| 2,742,217 | 4/1956 | Maxwell | 182/49 |
| 3,396,816 | 8/1968 | Kennedy | 182/49 |
| 3,477,542 | 11/1969 | McNenny | 182/49 |

*Primary Examiner*—Reinaldo P. Machado
*Attorney*—Julian C. Renfro

ABSTRACT: An improved ladder for use by a fruit picker, involving the use of a removable, lightweight receiving basket utilized in conjunction with an elongate tubular member, and arranged to be interfitted therewith so that fruit placed in the basket can be guided into the tubular member and thence carried by this member to a receiving location near the bottom of the ladder. My novel basket is very convenient for a fruit picker to use, and can be easily moved to any one of several locations on the ladder, depending on the height at which the picker may be working.

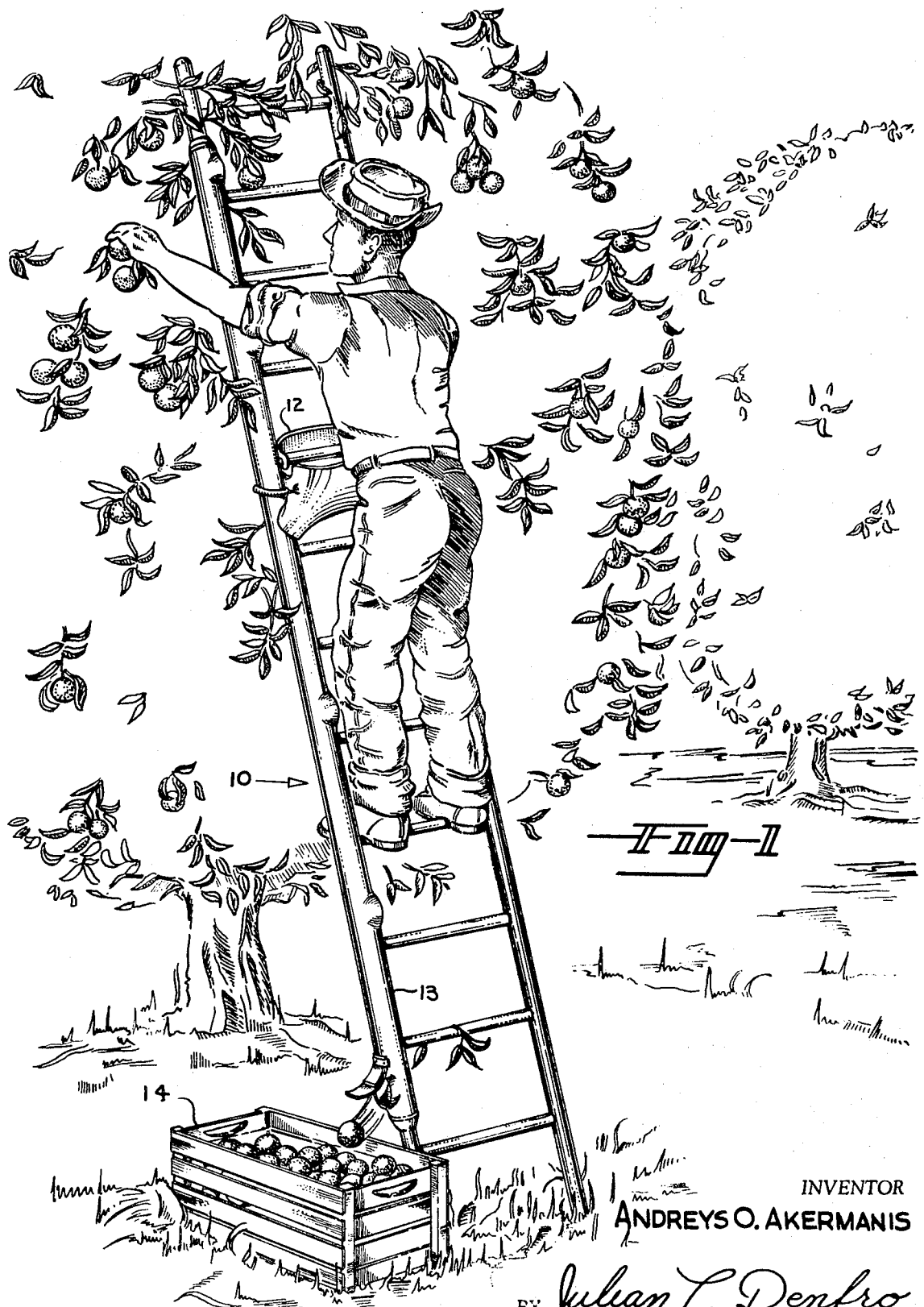

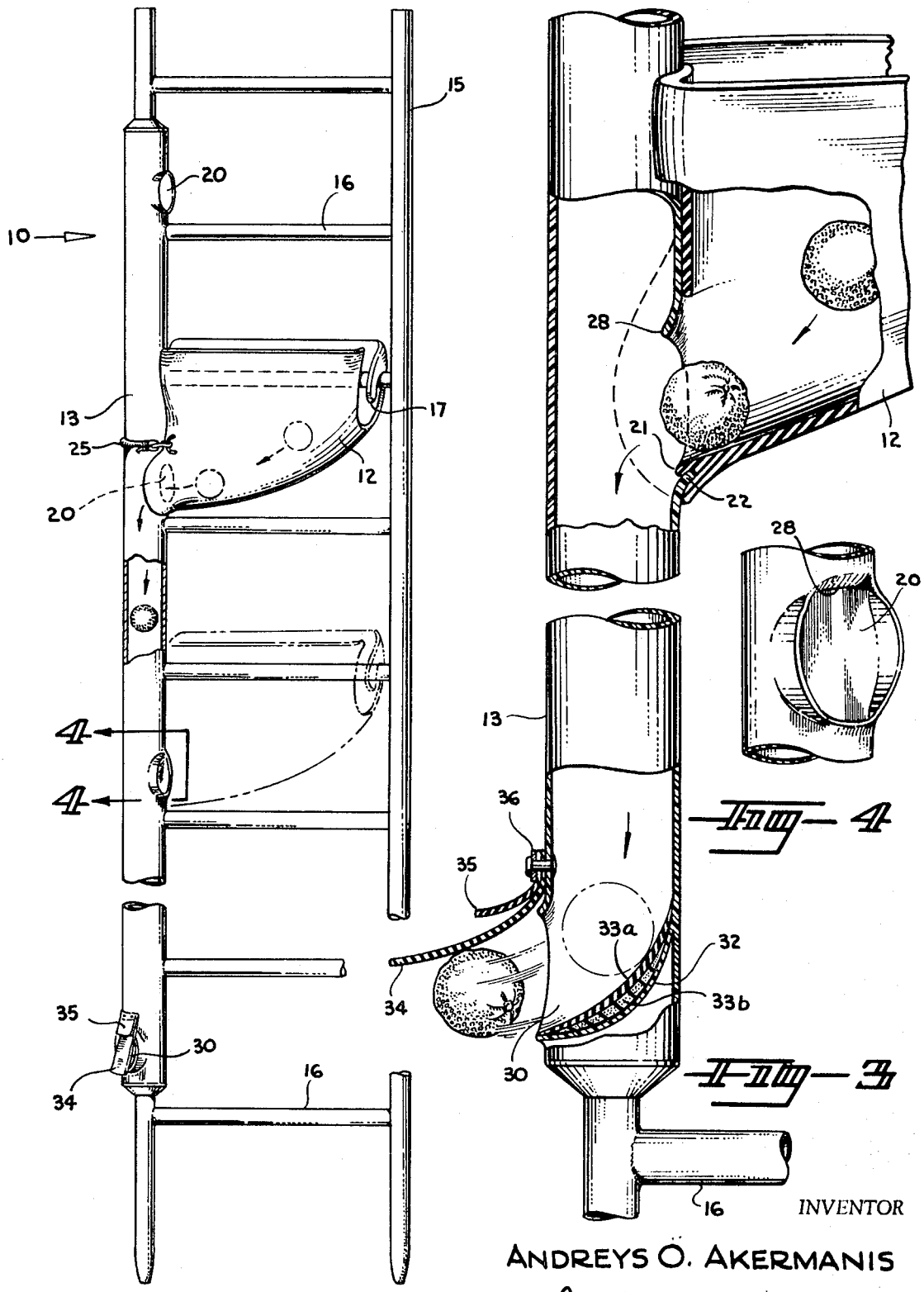

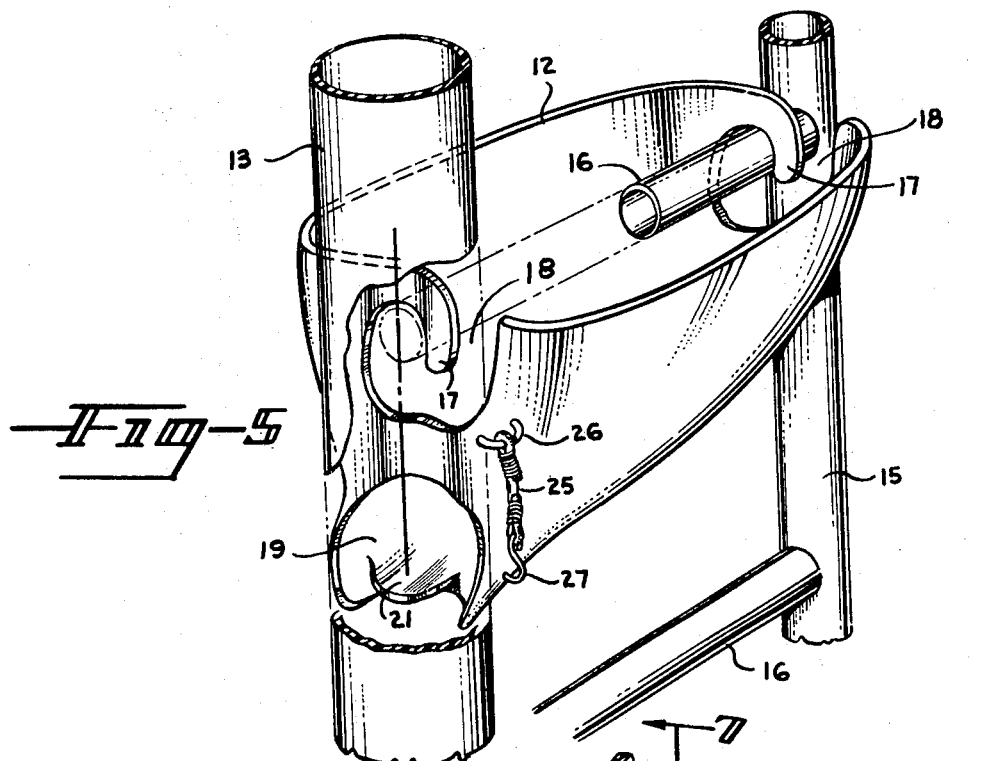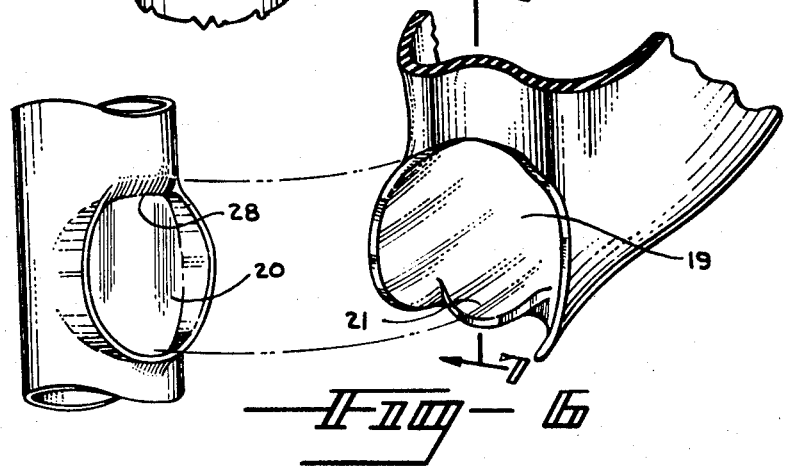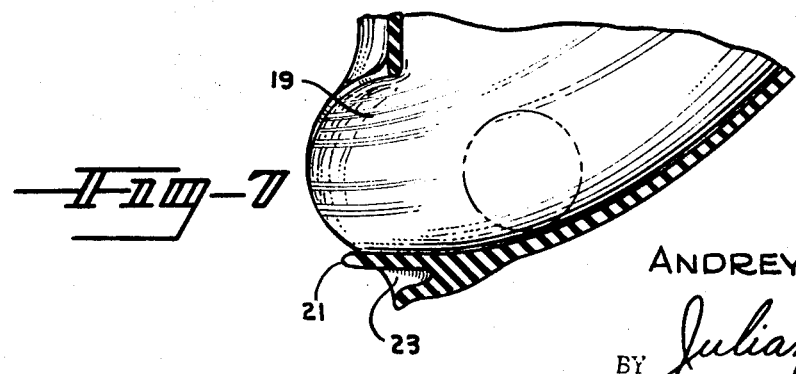

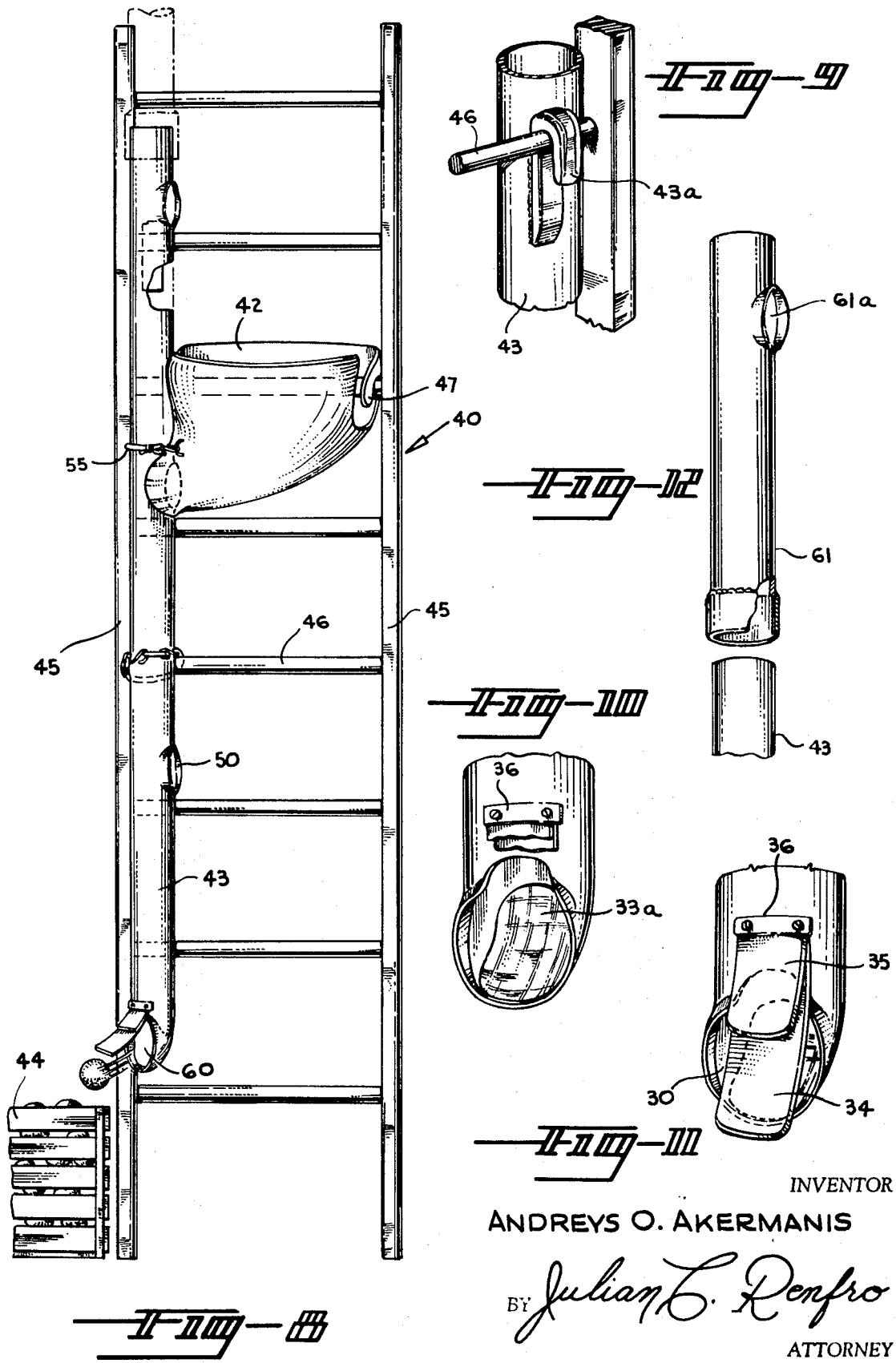

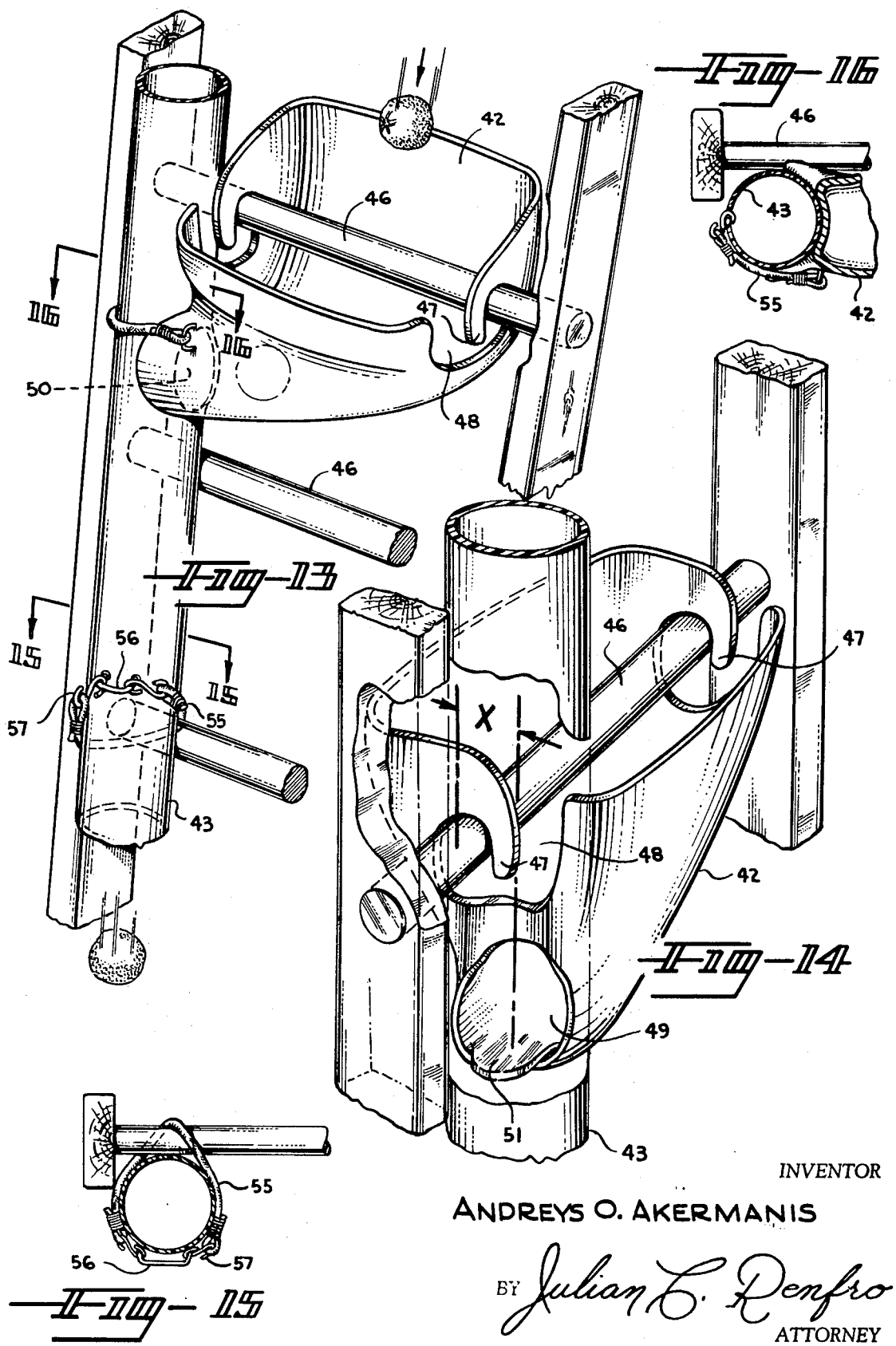

LADDER FOR FRUIT PICKER

This invention relates to a device designed to facilitate the job of the fruit picker, and more particularly to a ladder arrangement involving a lightweight receiving basket utilized in conjunction with a longitudinal tubular member that enables fruit to be quickly removed from the tree and conveyed without damage to a remote location. By virtue of this arrangement, the fruit picket is freed from any burdensome straps or bag, thus allowing him to work much more freely and rapidly than otherwise would be possible.

In the past, a number of arrangements have been proposed for the automatic or semiautomatic harvesting of fruit, but these devices to a great extent have been unsuccessful. Usually they have been quite expensive and prone to get out of order, but perhaps even more importantly, they usually can be relied upon to gather only a portion of the fruit on a given tree, leaving the rest to be picked by hand by a picker burdened by a weighty canvas bag that must be frequently emptied. Also, the fruit that is harvested is often at the cost of damage to the fruit itself as well as to the tree.

My invention does not seek to automate the fruit-picking procedure, but rather seeks to provide a vastly improved arrangement for transferring the fruit as it leaves the picker's hand quickly and easily into a device serving to convey the fruit to a receptacle such as a field crate or the like, without damaging either the tree or the fruit. My invention involves a modification upon the ordinary ladder of considerable length that is customarily used by fruit pickers, and comprises a novel lightweight receiving basket that is utilized in concert with a tubular member residing along one edge of the ladder. The basket is designed to be convenient to the branches being worked by the picker, so that the fruit can easily fall into the basket, and the tubular member is arranged to transfer and safely convey the fruit from the basket directly to a suitable receptacle on the ground. Thus, the picker can dispense with any kind of encumbrance as he climbs up and down his ladder to get to various portions of the tree.

Inasmuch as the fruit grows at random heights on the tree, it is most convenient to use a form of receiving basket that can be easily placed at a number of different height locations on the ladder, with the arrangement in each instance being such that an exit opening in the bottom of the receiving basket automatically lines up with a nearby, specially configured aperture in the tubular member. Thus, the fruit automatically rolls from the receiving basket into the tubular member and thence down the tubular member into the receptacle located adjacent the foot of the ladder. Various means are utilized for preventing the fruit from undesirably passing out through one of the lower apertures in the tubular member, and other means are provided for decelerating the fruit and preventing injury thereto.

My invention is not limited to use with any particular style or construction of ladder, and quite advantageously can be utilized either in conjunction with an existing ladder, or else this teaching may be followed at such time as new ladders are being manufactured, such that the tubular member is directly incorporated as one of the two side rails of the ladder. Whether as an added member or a vital component of the ladder, my novel tubular member when utilized in conjunction with the easily placed, conveniently configured receiving basket amounts to a low-cost arrangement that takes much of the drudgery out of the fruit picker's job. Also, my arrangement enables the picker to fill a larger number of field crates per day than was previously possible, when the picker had to frequently descend from the ladder and empty his sack. Additionally, a very distinct safety factor is involved in that the picker is not encumbered by the heavy sack or straps of any kind, and is thus much less likely to lose his balance and fall from the ladder.

I am of course aware that others have proposed ladders with a "fruit chute" down one side or down the center, but these have been expensive and heavy, but most importantly, were difficult to use in that the fruit picker usually had to insert the fruit piece by piece into an aperture in the chute. The weight of these arrangements was considerable, making them prone to tip unless placed along the longitudinal centerline of the ladder, but then it became necessary to straddle a bulky center portion, which was unwieldy and tiring.

I have overcome the disadvantages of the prior-art arrangements by providing a basket having an entirely open upper portion, into which the picker can quickly shake a cluster of oranges, causing them to drop off the branch and then to roll quickly and easily along the bottom of the basket to the exit opening, and thence into the tubular member. With this arrangement, the output of any fruit picker can be increased, and in some instances doubled.

It is therefore a principal object of this invention to provide a very convenient and useful adjunct to the fruit picker's ladder, enabling the picker to save much time and exertion, and yet be able to increase his production markedly.

It is another object of my invention to provide a fruit-conveying arrangement usable either in conjunction with an existing ladder, or capable of being incorporated into new ladder design, that enables the freshly picked fruit to be immediately transferred along a tubular member to a receptacle on the ground without damage to the fruit.

It is yet another object of my invention to provide a novel receiving basket into which the picker can quickly shake or drop the freshly picked fruit, with this basket being easily placed in the most convenient location on the ladder, and with the basket being moveable into cooperative relation with the tubular fruit-conveying member at each location.

These and other objects, features and advantages will be more apparent from a study of the appended drawings in which:

FIG. 1 is an overall perspective view of a typical ladder arrangement in accordance with my invention in use, with the various components being shown in operative relation;

FIG. 2 is a front view of a ladder constructed in accordance with the teachings and principles of this invention, with certain portions being removed in the interests of clarity;

FIG. 3 is a view to a larger scale of the ladder of FIG. 2, with certain portions being cut away so that key relationships may be seen more clearly;

FIG. 4 is a fragmentary view showing the detail associated with one of the apertures in the tubular member at which the receiving basket is attached;

FIG. 5 is a perspective view of a typical receiving basket of the type used with a ladder constructed to utilize a tubular member in its basic design;

FIG. 6 is a perspective view illustrating the relationship of the basket exit with respect to an aperture of the tubular member;

FIG. 7 is a cross-sectional view of the exit portion of a receiving basket, revealing lip detail;

FIG. 8 is an embodiment of my invention involving use of my novel components in conjunction with an existing ladder;

FIG. 9 is a fragmentary detail of the arrangement by which a separate novel tubular member is hooked or fastened to a rung of the ladder of FIG. 8;

FIG. 10 is a fragmentary view of the exit detail associated with the tubular member, illustrating the use of material designed to cushion the fall of the fruit;

FIG. 11 is a view closely related to FIG. 10, but illustrating the use of a pair of flap members for slowing the speed of the fruit as it leaves the tubular member;

FIG. 12 is a fragmentary view of a type of extension that may be used with a tubular member when usually tall trees are involved;

FIG. 13 is a fragmentary perspective view of a typical basket and tubular member when utilized in conjunction with an existing ladder;

FIG. 14 is a fragmentary view to a larger scale, revealing the interfitting relationships of a receiving basket and tubular member when utilized together on a wooden ladder;

FIG. 15 is a view taken at location 15—15 in FIG. 13; and

FIG. 16 is a cross-sectional view taken at location 16-16 in FIG. 13.

Turning now to FIG. 1, it will be noted that I have there depicted a ladder 10 constructed in accordance with the principles of this invention, shown resting against a portion of a large tree, such as a citrus tree 11. The arrangement is such that as the picker pulls or cuts the fruit from the tree, he causes it to fall into the receiving basket 12, which is located on the ladder at a height that is convenient to the location of the picker. Although the receiving basket is movable to various heights on the ladder, it nevertheless is designed to interfit at each location with the tubular member 13, such that the fruit dropped into the basket will enter the tubular member and thus descend through the tubular member into the crate or other receptacle 14.

Reference should now be had to FIG. 2, wherein the ladder 10 is revealed in greater detail. Although the longitudinal member 15 on one side of the ladder, such as the right side in FIG. 2, is of ordinary construction, the longitudinal member on the left side in this figure may be seen to incorporate the tubular member 13 during a substantial portion of its length. For example, the uppermost and lowermost portions of the left-hand member may be seen to be of more or less conventional construction, but the mid portion is of a size such that fruit even of substantial diameter can freely pass through the tubing without injury to the fruit and without the danger of hanging up in the tubular member 13. I prefer the use of plastic or fiberglass in the construction of the ladder, with the inner diameter of the tubular member being large enough to accommodate the size fruit being harvested. Tubing of plastic or fiberglass is strong enough for use in ladders, and advantageously is light enough that the ladder can be moved easily from location to location.

As will be noted in FIG. 2, and even to a larger scale in FIG. 5, an important part of this invention resides in the receiving basket 12 and in the manner in which it is employed. These baskets are preferably of lightweight material and arranged at the behest of the operator to be suspended from any one of a number of different rungs 16 of the ladder. A preferred type of construction involves baskets that have integral hook members 17, with these hook members being spaced as to easily reside between the tubular member 13 and the longitudinal member 15, and of a configuration such that they can hook into the selected rung of the ladder. Entrance passages 18 are disposed adjacent the hook members, with these passages being wide enough that the rungs will not bind therein as the basket is manipulated to cause the hook members to engage the rung; see FIG. 5. The baskets are preferably made of plastic, fiberglass, or rubber, or even woven from basket materials, or made up of some combination of these.

At the lowermost corner of each basket is an exit opening 19, through which the fruit passes into the adjacent aperture 20 of the tubular member 13; see FIG. 6. It will be noted that both the opening 19 and the aperture 20 are specifically configured to enable an effective interfitting of the basket 12 and the tubular member 13 to take place so that the fruit rolling out of the bottom of the basket will pass easily into the tubular member in the manner shown in FIGS. 2 and 3 of the drawing. As will be apparent, the relationship of the opening 19 to the hook members 17, and the relationship of the aperture 20 to the rung 16 are controlled such that when the basket 12 is suspended in the proper manner shown in FIGS. 2 and 5, the opening 19 and the aperture 20 will line up in the intended manner.

To give additional support and stability, I preferably configure the exit opening 19 to have a somewhat protruding lip 21 that will extend slightly into the bottom of the aperture 20 of the tubular member, as best seen in FIG. 3. To simplify this interfit, I preferably bend the bottom of the opening 20 outwardly slightly to form a protuberance 22, over which the lip fits. As shown in FIG. 7, a recess 23 may be provided in the bottom of the basket below the lip 21, into which the protuberance 22 fits. Thus, it will be seen that when the basket has been properly placed upon the selected rung 16, the holes 19 and 20 will coincide in the proper manner to cause the protuberance 22 to fit below the lip 21 and into the recess 23, and thus from a most effective interfitting relationship between basket and longitudinal member. This arrangement tends to prevent displacement of the basket, and assures stability. If desirable, I may utilize a bungee cord or strap 25 just above the opening 19 on the basket, which strap or cord can be passed around the tubular member as shown in FIG. 2 and then hooked, thus to make accidental displacement of the basket highly unlikely. The strap 25 is suspended from a ring 26 on the basket as shown in FIG. 5, and at the opposite end has a hook 27 that may engage the ring 26 after the strap has been passed around the tubular member.

It will also be noted in FIGS. 3 and 4 that the upper edge of the aperture 20 in the tubular member has an inward deflection 28, this serving to prevent the fruit passing down the tubular member from tending to pass out through a lower opening 20 and fall on the ground. In other words, at each aperture in the tubular member, the configuration is such as to deflect the fruit away from the opening and toward the opposite sidewall of the tubular member.

It will be noted in FIG. 3 that I provide an exit opening 30 near the bottom of the tubular member 13, through which opening the fruit passes after it has traveled the length of the tubular member. This opening is far enough off the ground that a field crate or other receptacle can be placed below the opening in the manner shown in FIGS. 1 and 8. Typically, this distance is slightly more than the height of the first rung from the bottom of the ladder. Preferably I configure the lower inside portion of the tubular member to form a sloped or ramp portion 32, that serves to redirect the path of the fruit and to cause it to move outwardly from the tubular member. Preferably, I dispose a pad 33a of soft rubber or the like on the sloped portion 32 so that injury to the fruit will be minimized if not entirely eliminated, and further, if desired, I can use a layer 33b of foam rubber or sponge rubber between the pad 33a and the ramp portion 32.

It may be desirable to use one or two flap members disposed so as to normally cover the opening 30, and as depicted in FIGS. 3 and 11, may comprise an inner flap member 34 and an outer flap member 35. The inner member is designed to cover the opening, but to be pushed aside by the fruit as it exits from the tubular member. The flap member 35 comes into play at such time as the member 34 has been moved part way into its outer position, with these two flap members cooperating to effectively reduce the speed of the fruit so that it drops easily into the receptacle 12. The flap members are preferably held in place by a metal strap 36 as best shown in FIGS. 10 and 11, with a pair of bolts extending through the strap, flaps and wall of the tubular member so as to removably yet effectively hold the flaps in the operative position. As will be obvious, the strap can be removed at such time as necessary for the replacement of the flap members.

Turning to FIG. 8, and the figures following that figure, it will be noted that my inventive concepts are not limited to use with a fiberglass or plastic ladder, or to a ladder that was manufactured so as to inherently and intrinsically include a tubular member 13. In FIG. 8 is revealed a ladder 40 such as of wood, upon which a basket 42 may be suspended in the general manner described in connection with the earlier figures. In this embodiment of my invention, a separate tubular member 43 is utilized through which fruit may pass and fall into the crate 44 disposed adjacent to the bottom of the ladder. The ladder may utilize identical or virtually identical longitudinal members 45 on each side, between which extend a plurality of rungs 46. As before, the basket 42 is equipped with a pair of hook members 47, which are adapted to encircle the rung 46 selected by the picker. Also as earlier described, entrance passages 48 are provided through which the rung is caused to pass as the basket is manipulated to place it in the operative position, illustrated in FIGS. 8, 13 and 14. When in such position, the exit opening 49 in the bottom of the basket is arranged to coincide with the opening 50 of the tubular member immediately below that rung.

At this point it should be noted that while the basket 42 is quite similar to the basket 12 described in connection with the earlier drawings, it nevertheless is configured such that the exit opening 49 is displaced a distance X from the approximate center of the opening defined by the hooked members 47, this distance X being depicted in FIG. 14. This arrangement is of course involved inasmuch as the tubular member 43 is not disposed in the imaginary plane that might be passed through the centerline of the rungs, but rather is disposed such that its outer surface rests against the rungs in the manner shown in FIGS. 8, 9, 13 and 14, and in cross section in FIGS. 15 and 16.

FIG. 9 reveals in a fragmentary manner how the tubular member 43 is supported by a hook member 43a from one of the highest rungs of the ladder 40. Additionally, one or more straps or bungee cords 55 may be utilized in the manner shown in FIG. 15 to secure the tubular member to the ladder so that it will not move in an undesirable manner during use.

As in the earlier embodiment, a bungee cord or strap 55 may also be utilized to hold basket 42 in operative relation with the tubular member 43; see FIG. 16. Also, the basket 42 can be provided with a lip 51 visible in FIG. 14 that interfits with a protuberance on the longitudinal member 43 adjacent each aperture.

In the instance of a separate tubular member 43, it may be desirable to make this member of moderate length, so that it can be used with most of the ladders utilized by the fruit pickers, and then provide for occasional use therewith an extension member 61 of the type depicted in FIG. 12. This extension will have at least one opening 61a, but of course can have more than one opening in the event a long extension is involved. The bottom of the extension member is provided with an enlarged diameter portion, so that the extension member can easily be inserted on top of the uppermost portion of the tubular member 43, and be retained thereon by virtue of a frictional fit.

As will now be apparent, I have provided a fruit picker's ladder using a basket means placed convenient to the picker at all times, so that he can shake clusters of fruit directly into the basket, thus avoiding having to handle each piece of fruit.

I claim:

1. In a ladder arrangement for use by a fruit picker, a tubular member through which fruit may pass while being conducted from an upper location on the ladder to a lower position, a relatively rigid receiving basket for use in conjunction with said tubular member, said basket having an open upper portion into which fruit may be easily dropped, and being equipped with means for supporting it in operative relation in any of several locations with respect to said tubular member, said basket having an exit opening in a bottom portion thereof so that fruit placed or dropped into said basket will move by gravity to and through said opening, means defining a plurality of apertures disposed at spaced locations along said tubular member, with the exit opening of said basket being arranged to interfit with one of the apertures as the basket is installed in an operative position, whereby fruit dropped into said basket will be caused to enter and pass down said tube to a receiving location.

2. The ladder arrangement as defined in claim 1 in which said tubular member is an intrinsic part of the ladder, serving as one of the longitudinal members of the ladder, to which at least some of the rungs are affixed.

3. The ladder arrangement as defined in claim 1 in which said tubular member forms an adjunct for use with a preexisting ladder, and means for securing said tubular member adjacent one of the longitudinal members to which the rungs of the ladder are affixed.

4. The ladder arrangement as defined in claim 1 in which means are provided around the exit opening of each basket, to interfit with a portion of the aperture adjacent which it may be placed.

5. The ladder arrangement as defined in claim 1 in which means are provided at the apertures in said tubular member to deflect fruit passing down said tubular member away from said apertures, thus preventing it from falling out of the tubular member prematurely.

6. A basket for use with a ladder equipped with a nonsymmetrically disposed tubular member, disposed along one side of the ladder, down which member fruit may pass, said basket comprising support means enabling it to be suspended from a selected rung of the ladder, and having an open upper portion into which fruit may easily be dropped, said basket also having an exit opening at a lower location, said exit opening being nonsymmetrically placed on said basket, and being disposed so that on occasion it can be interfitted with a selected aperture in said tubular member that is disposed along one side of said ladder, whereby fruit dropped into the basket will roll toward and out of said exit opening and thence into said tubular member, to be transported to a lower location.